March 23, 1926.  
J. A. McGRATH  
HOLDING DEVICE  
Filed Nov. 18, 1925

INVENTOR.  
Joseph A. McGrath,  
BY  
ATTORNEY.

March 23, 1926.                     1,578,154
J. A. McGRATH
HOLDING DEVICE
Filed Nov. 18, 1925           2 Sheets-Sheet 2

INVENTOR.
Joseph A. McGrath,
BY
Geo. F. Kimmel    ATTORNEY.

Patented Mar. 23, 1926.

1,578,154

UNITED STATES PATENT OFFICE.

JOSEPH A. McGRATH, OF BROOKLYN, NEW YORK.

HOLDING DEVICE.

Application filed November 18, 1925. Serial No. 69,911.

*To all whom it may concern:*

Be it known that I, JOSEPH A. MCGRATH, a citizen of the United States, residing at Brooklyn, in the county of Kings and State of New York, have invented certain new and useful Improvements in Holding Devices, of which the following is a specification.

This invention relates to a holding device designed primarily for use in connection with the rear doors of a vehicle, such as a delivery closed body type, but it is to be understood that a holding device, in accordance with this invention, can be employed in any connection for which it is found applicable, and the invention has for its object to provide, in a manner as hereinafter set forth, means for detachably securing the doors of the vehicle in open position to prevent the closing thereof by the wind or the accidental closing thereof when loading the vehicle.

A further object of the invention is to provide, in a manner as hereinafter set forth, a holding device for detachably securing the rear doors of a vehicle in open position at an angle of 90° with respect to the vehicle body.

Further objects of the invention are to provide, in a manner as hereinafter set forth, a holding device for the purpose referred to, which is simple in its construction and arrangement, strong, durable, compact, thoroughly efficient in its use, readily installed with respect to the vehicle, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:—

Figure 1:
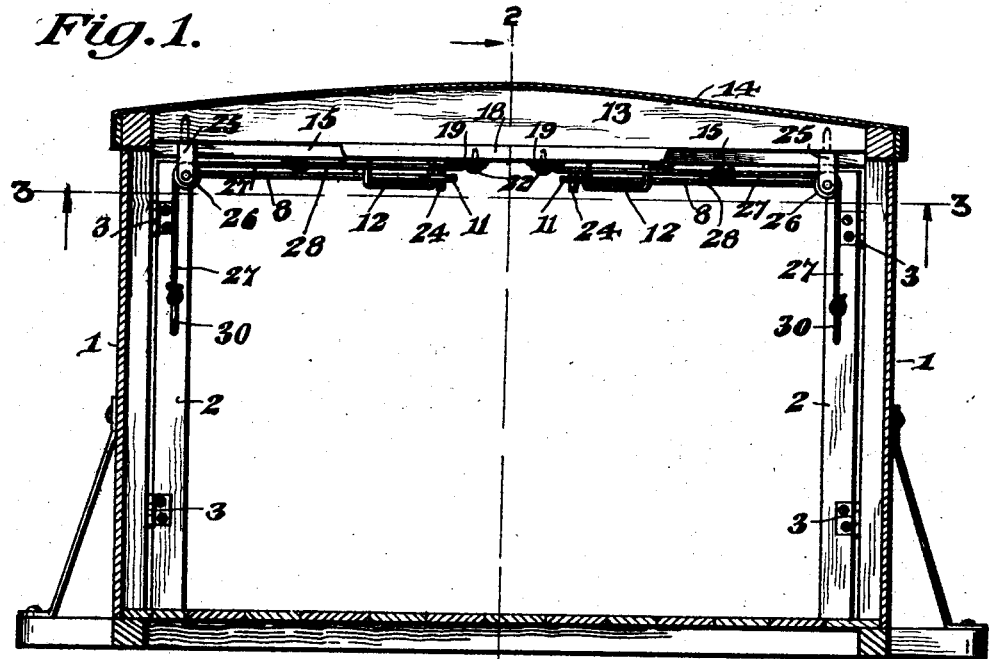
Figure 1 is a vertical sectional view of the closed body of a vehicle, showing the adaptation therewith of a pair of holding devices, in accordance with this invention for the rear doors of the vehicle, the doors being in open position.
Figure 2:
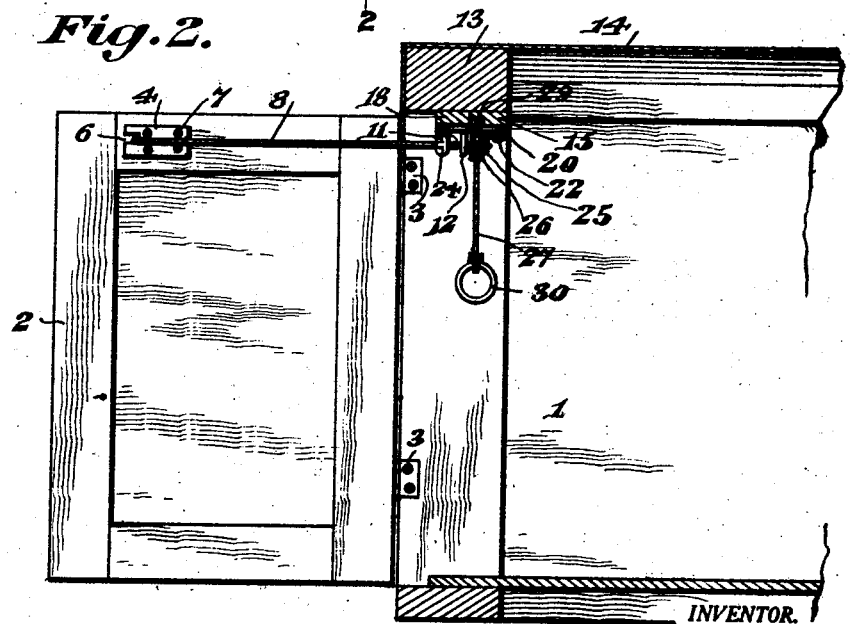
Figure 2 is a section on line 2—2, Figure 1.

Referring to the drawings in detail, 1 denotes the closed body or top of a vehicle provided with a pair of rear doors 2 for closing the rear end of the body 1. The doors 2 are hinged, as at 3, and swing to open position in opposite directions with respect to each other. Each door 2, at the top thereof, is provided with a plate 4 formed with an opening 5 and a notch 6. The plate 4 is of rectangular contour and positioned adjacent the free vertical edge of the door. Holdfast devices 7 are employed for fixedly securing the plate 4 in proximity to the top edge of the door. The plate 4 is termed a coupling member.

Figure 3:
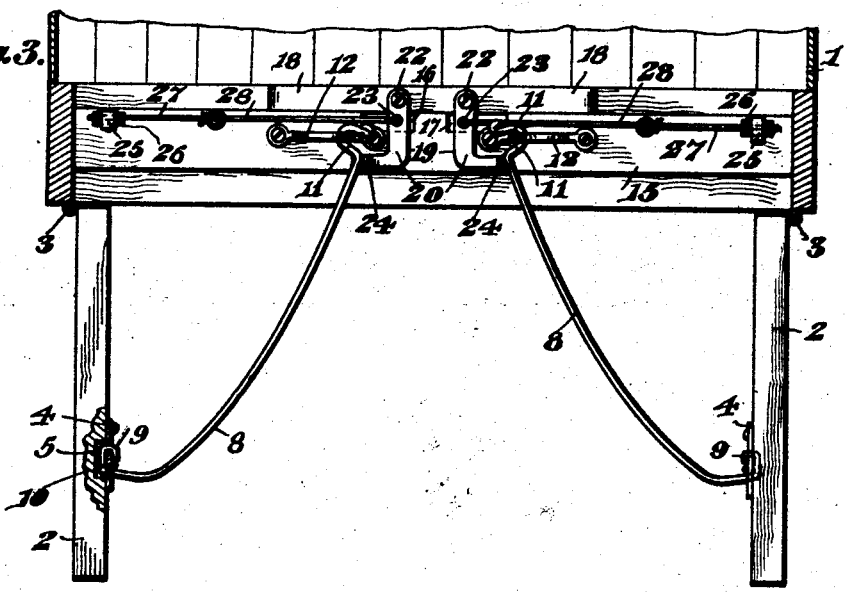
Figure 3 is a section on line 3—3, Figure 1.

Associated with each door is a holding device and as each of said devices is of the same construction but one will be described as the description of one will apply to the other. The holding devices are oppositely disposed with respect to each other and each of said devices consists of a curved locking rod 8 provided at its outer end with a hook-shaped terminal 9, which extends through the opening 5 and overlaps a plate 4, and further extends into a pocket 10 across the mouth of which extends the plate 4. The rod 8 also extends through the notch 6, which is arranged at the outer end of the plate 4. The opening 5 in the plate 4 is arranged rearwardly with respect to the notch 6. The rod 8 is further provided with a yoke-shaped inner terminal 11 which coacts with one of the arms of a yoke-shaped bracket 12 for the purpose of maintaining the door 2 in open position as illustrated in Figure 3. The bracket 12 is termed a combined guide and locking element for the rod 8.

Secured to one of the supporting beams 13 for the roof 14 of the body 1 is a flat bar 15, formed in its rear edge with a pair of spaced notches 16, 17 and each thereof is associated with a holding device. Abutting against the bar 15, as well as secured to the beam 13 is a strip 18 which closes the open ends of the notches 16 and 17. Each notch is rectangular in contour. Pivotally connected to the strip 18 and extending across the notches 16 and 17 is a pair of releasing members and each member associates with a holding device.

Each of said releasing members is indicated generally by the reference character 19 and consists of an L-shaped body portion having the legs thereof indicated at 20, 21. The leg 20 is of greater length than the leg 21 and is pivotally connected at one end, as at 22, to the strip 18. The leg 20, intermediate its ends, is formed with an opening 23 and the leg 21 at its free end is provided with a vertically disposed leg 24. The member 19 extends rearwardly and the rod 8, when in holding or locking position with respect to the door 2, is arranged in the path of the lug 24 on the arm 21 of the member 19. See Figure 3. The yoke-shaped bracket 12 is positioned rearwardly with respect to a notch 16 and the rod 8 during the opening and closing movement of the door travels between the bracket 12 and the bar 15.

Secured to the bar 15, in proximity to each end thereof, is a hanger 25 and each of which forms an element of a holding device. Revolubly mounted in each hanger 25 is a pulley 26 over which travels a flexible pulling cable 27, which is connected at its upper end to a pull bar 28 attached to a member 19. The bar 28 is extended through the opening 23 in the member 19 and bent around the latter, as at 29, whereby said bar 28 is connected to the member 19. The bar 28 is positioned forwardly with respect to the bracket 12 and the hanger 25 is also arranged in such relation with respect to the bracket 12. The lower end of the pulling cable 27 carries a ring 30, to facilitate the operation thereof when it is desired to release the holding or locking rod 8.

Figure 4:
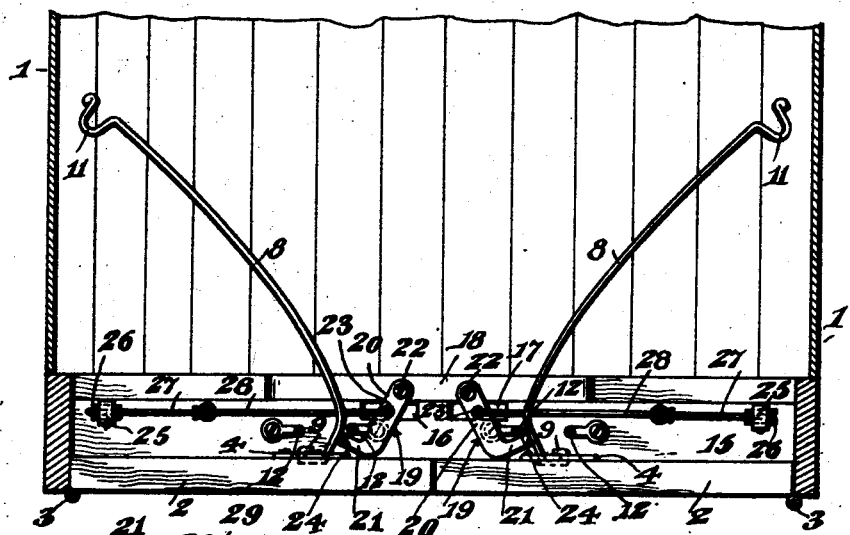
Figure 4 is a fragmentary view, in sectional plan, of the vehicle body showing the adaptation therewith of a pair of holding devices, in accordance with this invention, and with the rear doors closed.
Figure 5:
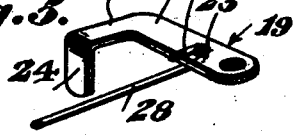
Figure 5 is a perspective view of the releasing member of the device.

It will be assumed that the position of a holding device is as shown in Figure 4, and the door closed. The door is swung outwardly carrying the holding or locking rod 8 therewith, and owing to the curvature of the rod in connection with the hook-shaped terminal 11, the latter will engage one of the arms of the bracket 12, see Figure 3, and maintain the door in open position and disposed at an angle of 90°. When the rod 8 is in the position as shown in Figure 3, the terminal portion 11 thereof will overlap the inner arm of the bracket 12 and will maintain the door in the position shown in Figure 3. When it is desired to release the rod 8 to permit of closing the door, the member 27 is pulled downwardly carrying the bar 28 therewith, which will swing the releasing member 19 in a direction towards one side of the body 1 and as the member 19 moves in such direction the arm 21 thereof will be swung towards the rod 8. As the arm 21 moves towards the rod 8, the lug 24 will engage the rod 8 and shift the terminal portion 11 thereof clear of the arm of the bracket 12 and release the rod 8 so that the door can be swung to the position shown in Figure 4.

It is thought the many advantages of a holding device, in accordance with this invention, can be readily understood, and although the preferred embodiment of the invention is as illustrated and described, yet it is to be understood that changes in the details of construction can be had which will fall within the scope of the invention as claimed.

What I claim is:—

A holding device for the purpose set forth, comprising a curved, shiftable holding rod adapted to have its outer end anchored to the element with which the device is associated, a yoke-shaped bracket associated with said rod and having one of its arms engaging in the inner terminal of the rod when the latter is shifted outwardly thereby maintaining the rod in extended position for holding said element in set position, a pivoted L-shaped releasing member positioned when moving in one direction on its pivot to have one of its arms engage said rod to release the same to permit of the rod swinging inwardly from holding position, thereby releasing said element, and means connected to said member for shifting it to release said rod.

In testimony whereof, I affix my signature hereto.

JOSEPH A. McGRATH.